United States Patent [19]

Taupin

[11] Patent Number: 5,082,414
[45] Date of Patent: Jan. 21, 1992

[54] HELICOIDAL DEVICE FOR EXTRACTING MATERIAL IN PARTICLE FORM FROM A RESERVOIR

[76] Inventor: Jean-Paul Taupin, Moulin du Vivier, 58130 Urzy, France

[21] Appl. No.: 465,063
[22] PCT Filed: Feb. 23, 1988
[86] PCT No.: PCT/FR88/00101
  § 371 Date: Nov. 30, 1989
  § 102(e) Date: Nov. 30, 1989
[87] PCT Pub. No.: WO89/08067
  PCT Pub. Date: Sep. 8, 1989
[51] Int. Cl.⁵ .............................. B65G 65/40
[52] U.S. Cl. ........................ 414/306; 222/411; 222/413; 198/778; 414/325
[58] Field of Search ............... 414/304, 305, 306, 307, 414/309, 310, 311, 312, 313, 315, 319, 320, 321, 325, 326; 198/778, 657; 222/410, 411, 412, 413

[56] References Cited

U.S. PATENT DOCUMENTS 3,707,224 12/1972 Rastoin .
3,817,407 6/1974 Cantenot .................. 414/306 X
4,291,647 9/1981 Legrain .
4,512,502 4/1985 Landers .................... 222/413

FOREIGN PATENT DOCUMENTS 66417 2/1948 Denmark ..................... 414/310
0016685 3/1980 European Pat. Off. .
1277146 9/1968 Fed. Rep. of Germany ...... 414/313
1918698 10/1970 Fed. Rep. of Germany .
1376898 9/1964 France .
2067127 8/1971 France .
2603568 9/1986 France .
161711 12/1980 Japan ...................... 222/413
2098967 12/1982 United Kingdom ........... 222/411

Primary Examiner—Frank E. Werner
Attorney, Agent, or Firm—Bacon & Thomas

[57] ABSTRACT

An extraction device for extracting a material in particulate form from a reservoir includes an extraction member in the form of a helicoidal winding connected to a motor for driving it in rotation about its central axis. The helicoidal winding is driven so as to sweep it about an axis of sweep along the bottom of the reservoir and the winding may be curved at its distal end so as to sweep along the periphery of the reservoir. The winding may be enclosed within a tubular conduit and a section of the peripheral wall of the reservoir may be provided to cooperate with the helical winding.

11 Claims, 2 Drawing Sheets

HELICOIDAL DEVICE FOR EXTRACTING MATERIAL IN PARTICLE FORM FROM A RESERVOIR

TECHNICAL DOMAIN

The invention relates to a device for extracting a material in particle form, i.e. pulverulent or granular, from a reservoir, particularly a silo.

The technical domain concerned is that of the mechanical extraction of such materials from an extraction member of helicoidal type.

PRIOR ART

The prior art knows two families of such extraction members.

The first family relates to devices comprising at least one rigid screw disposed, at least partially, parallel to the bottom or to the base of a reservoir. The screw is animated by a movement of rotation on itself and by an angular sweeping displacement about an axis, generally perpendicular to the plane of the bottom or the base.

Extraction is effected by entrainment and evacuation of the product in the direction of an outlet occupying, most often, the center of the bottom.

The devices of this family do not give entire satisfaction for different reasons. They are generally expensive to buy and maintain and represent cumbersome structures. The screw constitutes a rigid member comprising a core, of appreciable section, constituting a brake to the progression of angular displacement within the mass of material. The rigid structure of the screw and its section require the application of a driving torque of high value, as soon as rotation starts and, consequently, the employment of expensive high-power motorization means. The means for supporting the screw, necessarily employed, results in the screw being placed at a distance from the bottom or base of the reservoir. The screw is thus incapable of scraping a minimum layer of product which permanently remains on the bottom of the reservoir. Moreover, a rigid screw, due to its structure, does not make it possible to furnish variable dosages below a determined minimum dosage.

The second family concerns devices comprising an extractor member in the form of a helicoidal filiform winding; a winding of a thin, rod-like element. The object of the invention specifically relates to the devices of this second family.

The prior art furnishes several propositions for producing extractor devices relating to this second family.

One of them is taught by Patent FR 1 376 898 providing a storage enclosure comprising, at a distance from the bottom, a rectilinear, helicoidal, filiform winding occupying a fixed position and driven in rotation on its axis. Such a device presents the drawback of not being able to be adapted to reservoirs of cylindrical shape, generally retained for storing pulverulent or granular products or materials. Another drawback of this device resides in the impossibility of extracting all the mass of products or materials from the reservoir, due to the establishment and support of the winding at a distance from the bottom.

Another proposition has been made by Application EP-A-0 016 685 providing to arrange a peripheral annular groove open in the flat bottom of a reservoir. A helicoidal filiform winding is housed in the groove in which it may be animated by a rotation on its axis by a driving member fitted at one of its ends. The filiform winding according to this teaching performs in fact only a function of take-up as the extraction proper is ensured by a scraper rotating in a plane parallel to the bottom of the reservoir.

Such a device employs two distinct scraping/extracting and drawing-off means requiring two means for driving in rotation and two monitoring and servocontrol systems. In addition, such a device has for a drawback to leave on the flat bottom of the reservoir a layer or cake of products or materials whose thickness is equal to the distance separating the bottom from the plane of rotation of the rotating scraper.

Application DE-A- 19 19 698 should also be mentioned, providing extending the truncated bottom of a reservoir by a bent conduit in which is disposed a helicoidal filiform winding moved in rotation on its axis. The terminal part of the winding rises substantially vertically inside the truncated bottom occupied by the product or material in particle form.

Such a device presents several drawbacks. The first consists in that its use cannot be envisaged for flat-bottomed reservoirs. The second resides in the inefficiency of extraction associated with such a proposition. In fact, shortly after setting in rotation, the terminal part of the filiform winding makes itself, within the mass of pulverulent or granular product, a housing inside which it is centered. The natural tendency of the product to vaulting or autocompaction opposes collapse and, consequently, rotation of the terminal part is effected inside the housing that it has created without effecting extraction.

STATEMENT OF THE INVENTION

The present invention has for its object a novel extraction device, of the helicoidal filiform winding type, designed to:

perform an efficient extraction of a product in particle form from a reservoir, be adaptable to any shape of reservoir bottom of general structure of revolution, allow complete extraction of a mass of product in particle form without leaving a layer or cake on the bottom, be simple, robust, reliable and require no maintenance, require the operation of only one motorization means.

To attain the above objects, the device according to the invention, of the type comprising at least one extraction member, of the filiform type, in the form of a helicoidal winding, connected at one end to a motor for driving in rotation on the general axis of said member which extends near a support wall belonging to the reservoir, is characterized in that this member:

is associated with means adapted to animate it in an angular displacement about an axis of sweep traversing the support wall, presents at least one terminal part of filiform type extending at least in part in a radial direction with respect to the axis of sweep, and is obliged to cooperate with and follow the support wall during its angular displacement.

Various other characteristics will appear from the description made hereinbelow with reference to the accompanying drawings which show, by way of non-limiting examples, embodiments of the object of the invention.

BEST WAY OF CARRYING OUT THE INVENTION

Figure 1:
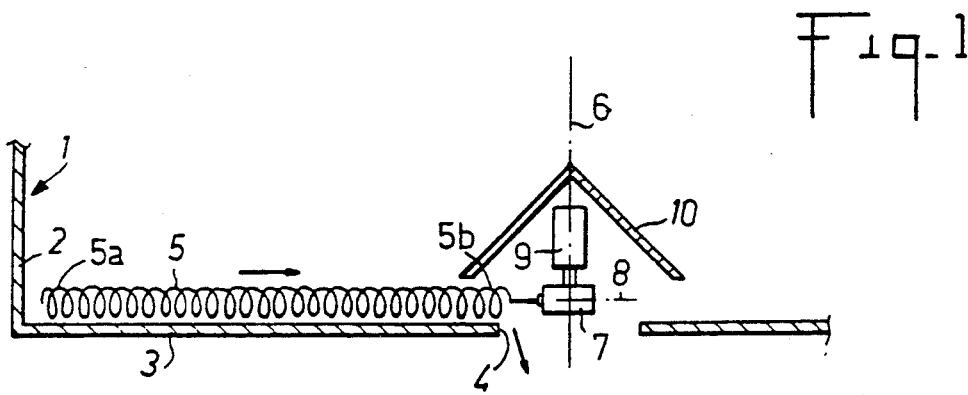
FIG. 1 schematically shows, in partial vertical section, a first embodiment of the object of the invention.

FIG. 1 partly shows a storage reservoir 1 comprising a cylindrical lateral wall 2 and a base or bottom 3 at the centre of which is provided an evacuation opening 4 connected to receiving devices (not shown).

The extraction device according to the invention comprises a helicoidal filiform winding 5, of any appropriate cross-section, preferably supple in deflection, extending at least in part radially with respect to the axis 6 of the reservoir, resting on the bottom thereof. The winding 5 presents a first free terminal or distal section 5a and a second section 5b connected to the proximal end of section 5a and to a motor 7 for driving in rotation on the axis 8 of the winding. The motor 7 is associated with means 9 for driving the winding 5 in angular sweep on the sweeping axis 6. A cap 10, preferably conical in form, protects the drive means 7 and 9.

Rotation of the winding 5 on its winding axis 8, combined with the angular sweeping displacement in abutment on the bottom 3, drains the material in particle form contained in the reservoir, in the direction of the arrow towards the opening 4, the direction of rotation of the winding 5 on its axis being chosen to that end as a function of the direction of the pitch of the winding.

The use of a filiform winding, of supple nature and of at least partly radial disposition, makes it possible to effect a drive in rotation applied at start turn after turn. The torque exerted on the power take-off of the winding is thus established progressively, which makes it possible to employ a motor 7 whose power is less than that which would be necessary for driving a helicoidal member of the screw type. The progressive application of the torque also makes it possible to eliminate the risks of rupture.

The supple nature of the winding 5, which may be assimilated to a helical spring, makes it possible, in addition, to effect an efficient extraction of the material from a bottom 3 of reservoir of any appropriate shape. This possibility is advantageous as it allows the device to be used for all types of applications necessitating that the bottom 3 presents a suitable form, such as a convex, concave, conical funnel, etc...

Figure 2:
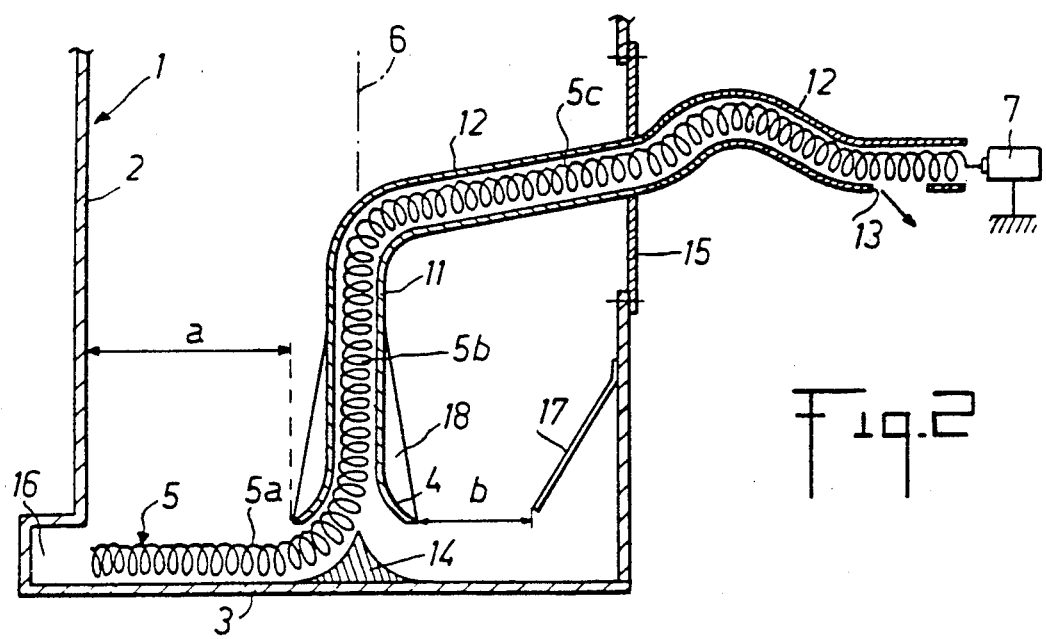
FIG. 2 schematically shows in partial, vertical section a second embodiment.

FIG. 2 illustrates a variant embodiment in which the reservoir 1 comprises a vertical tube 11 coaxial to the central axis 6 and which opens out by an opening 4 in the form of a trumpet above the base 3, which advantageously comprises a curvilinear truncated male shape 14 complementary of the opening 4. The tube 11 extends upwardly by a section 12 which emerges from the reservoir through a plate 15 removably fixed on a lateral opening in the reservoir. The tube 11 comprises, outside the reservoir and after a more or less complicated path taking into account the conditions of implantation, an orifice 13 for evacuation by gravity. The section of extension 12 may be supple, at least partially.

The supple helicoidal member 5 comprises a radial sweeping part 5a, an axial drive part 5b and an extension part 5c connected to the motor 7.

In order to take into account the extension or shortening of the winding 5 as a function of its load, the bottom of the lateral wall 2 may be provided with a peripheral horizontal housing 16 (embodiment shown on the left-hand side of FIG. 2) or covered with a peripheral funnel-like deflector 17 (right-hand side of FIG. 2).

The flare of the bottom of tube 11 is covered on the outside by a truncated shape 18 whose gradient is sufficient to allow natural flow of the product to be extracted.

The diameter of the winding 5, its pitch and the section of the wire may vary along the winding.

The respective diameters of the winding 11 and of its extension 12 are selected to allow free rotation of the winding 5 on itself with a clearance adapted to the material in particle form. The pitch of the winding 5, the shape and the transverse dimensions of the wire constituting it, are adapted to the flowrate to be attained, the torque to be transmitted and to the material in particle form.

The device operates as follows. Off-load, the winding 5 driven by the motor 7 rolls freely, at the level of its radial part 5a on the base 3, about axis 6.

Loaded, when the reservoir is filled at least partially with material in particle form, the radial rotation of the part 5 is braked by the mass of the material and is effected only as the material is levelled by each turn of part 5a in rotation, assisted in this by its abutment on the bottom of the silo. This entrains this material towards the trumpet tube 11, then, from there, through the extension 12, as far as evacuation 13.

Upon each complete turn of the base of the reservoir 1, the part 5a covers the whole of the apparent surface of the base 3 and prevents any vaulting of the material, as the distance a from the lateral wall 2 to the base of the tube 11, or the distance b from the bottom of the funnel 17 up to the base of the tube 1, is chosen to be greater than the maximum distance of arching of the material.

A reverse device might be envisaged, consisting in causing the tube 11 to emerge by the base 3 with a wall for connection to the opening 4 in the base, preferably with curvilinear generatrix.

Figure 3:
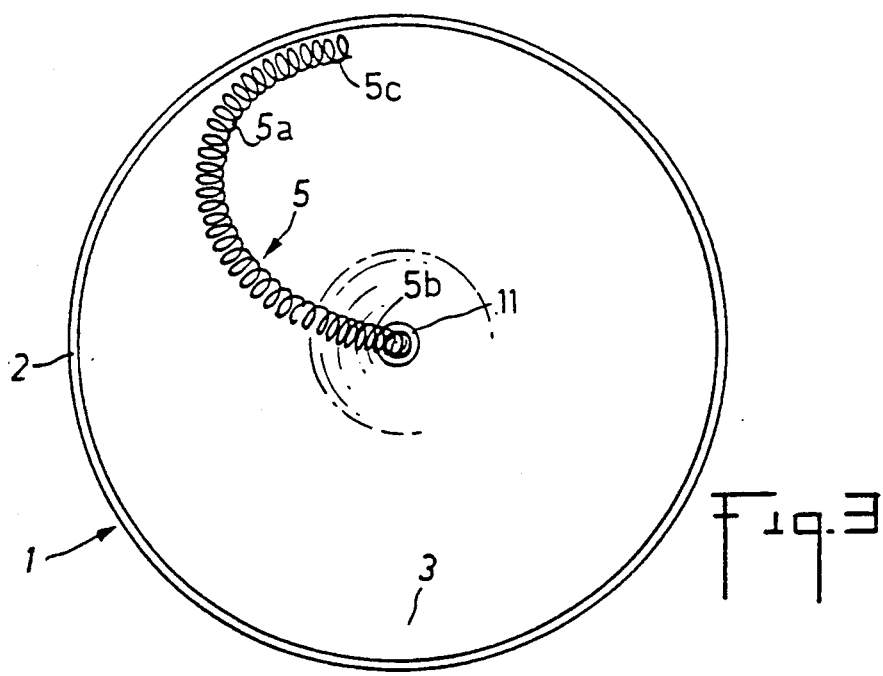
FIG. 3 schematically shows, in section from above, a third embodiment.

FIG. 3 shows a development which may be employed with the above embodiments. According to this development, the terminal part 5a presents an extension 5c, of length such that it is obliged to form a curved portion in the direction of angular sweep, partly abutting against the peripheral wall 2. The extension 5c is of sufficient length for the above condition to be respected, whatever the variations in length of the winding as a function of the load that it undergoes and for the radius of curvature imposed to allow rotation of the winding on itself.

Rotation of the winding 5 on itself causes screwing of the extension 5c in the mass of the material, creating, by reaction, a component of tangential force making it possible to provoke drive of the winding 5 in angular sweep around axis 6.

The length of the extension 5c, its diameter and that of the wire constituting it, the pitch and direction of the pitch, are determined so that, as a function of the material to be extracted, the extension 5c can screw in the material.

The direction of rotation of the winding 5 and of the extension 5c, with respect to the wall 2 on which it abuts, is chosen as a function of the direction of the pitch, so that the winding 5 is obliged to apply against the bottom 3.

Figure 4:
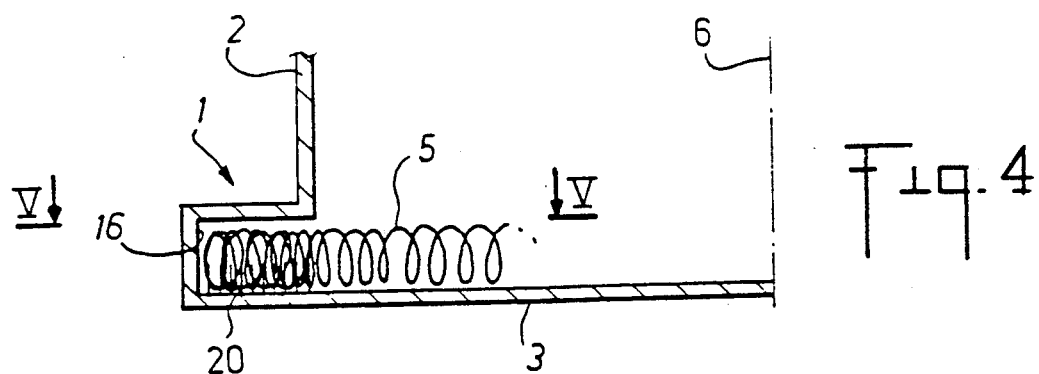
FIG. 4 schematically shows, in partial section, a fourth embodiment.
Figure 5:
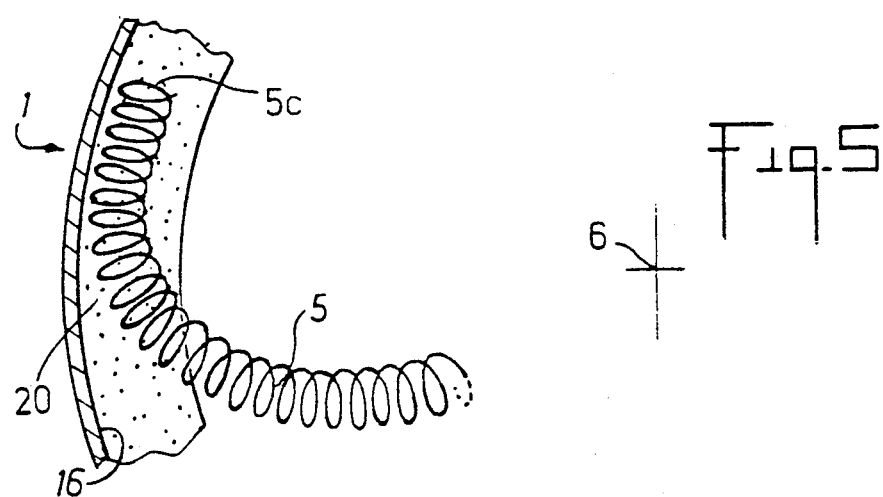
FIG. 5 schematically shows a partial section taken along line V—V of FIG. 4.

According to the development of FIGS. 4 and 5, it is advantageous to provide, particularly but not exclusively in the event of the peripheral wall 2 defining the annular housing 16, arranging on the periphery of the bottom 3, a reaction element 20 adapted to cooperate with the extension 5c to promote its progression and action of drive in displacement of the winding 5 in angular sweep of the bottom 3. The reaction element 20 consists in a local coating offering a surface state in which the turns of the extension 5c may take and screw. A surface state which is particularly well suited to that end is constituted by semi-rigid bristles, spines, barbs, fibers or loops to offer a sufficient reaction to provoke the progression of the extension 5c whilst being elastically retractable in the case of overload imposed on the winding.

Figure 6:
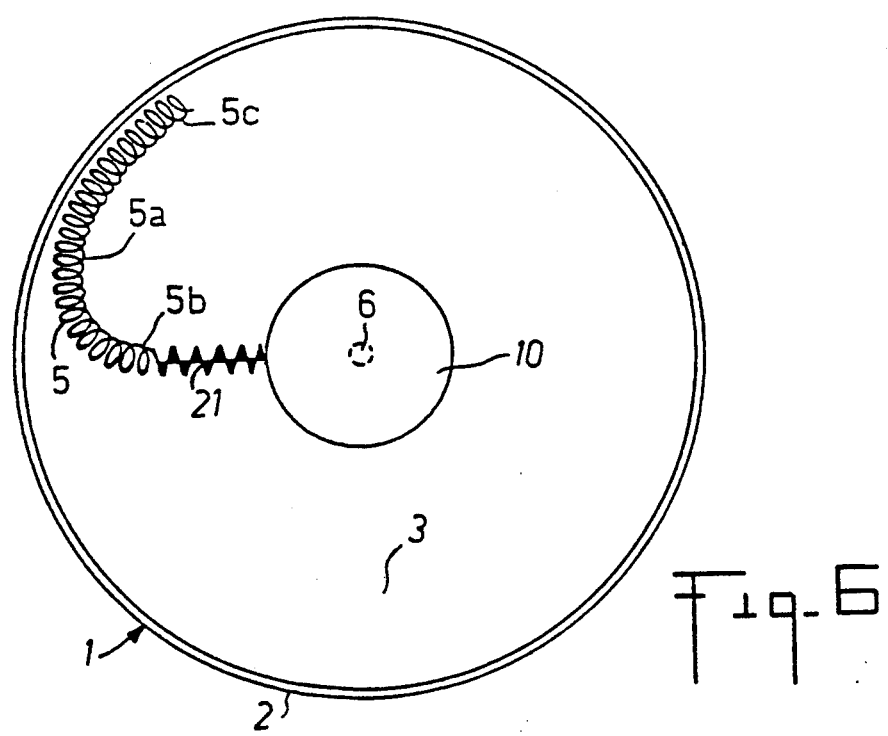
FIG. 6 schematically shows in view from above, another embodiment.

FIG. 6 shows a variant embodiment consisting in producing an extractor member by means of a helicoidal filiform winding responding to the above characteristics and fitted at the end of a radial segment of rigid screw 21 connected to the drive means 7 and 9 of the embodiment according to FIG. 1 for example.

INDUSTRIAL APPLICATION

The invention finds a particularly advantageous industrial application in the extraction of flour from reservoirs.

I claim:

1. An extractor for removing particulate material from the bottom area of a particulate material reservoir including a peripheral wall, the extractor comprising:
    a helicoidal wound flexible rod section being coiled along a substantially longitudinal axis having proximal and distal ends, and disposed so as to lie upon and extend along a bottom area of a particulate material receptacle;
    drive means for driving the wound rod section in rotation about its axis of coiling connected to the proximal end only of the wound rod section;
    said wound rod section otherwise being unsupported, with the distal end of the wound rod section disposed adjacent a peripheral wall of the receptacle;
    means for driving the wound rod section to cause sweeping motion of the wound rod section in a direction parallel to and along said bottom area, and to cause the distal end of the wound rod section to traverse the peripheral wall of the receptacle.

2. The extractor as claimed in claim 1, wherein the means for driving the wound rod section in a sweeping motion causes transverse sweeping motion of the wound rod section about a sweeping axis intersecting the bottom area of the receptacle adjacent the proximal end of the wound rod section, and wherein said wound rod section at least in part extends in a radial direction from said sweeping axis.

3. The extractor as claimed in claim 2, including a discharge opening for particulate material adjacent the sweeping axis.

4. The extractor as claimed in claim 1, wherein said wound rod section includes a distal end area abutting said peripheral wall with said distal end area extending along a portion of said peripheral wall, said wound rod section being bent so that during sweeping motion the distal end of the wound rod section trails the proximal end thereof.

5. The extractor as claimed in claim 4, including means for at least partially restraining the distal end area of the wound rod so as to require the distal end area to remain adjacent the peripheral wall and the bottom area of the receptacle during sweeping movement of the wound rod section.

6. The extractor as claimed in claim 5, wherein said means for at least partially restraining the distal end area of the wound rod section comprises a recess in the peripheral wall of the receptacle adjacent the bottom area thereof, said distal end area of the wound rod section disposed in said recess during its sweeping motion.

7. The extractor as claimed in claim 5, including reaction means adjacent the means for restraining the distal end area of the wound rod section for engaging the distal end area of the wound rod section and causing a reaction force against the wound rod section when the section is driven rotationally about its axis of coiling, said reaction force driving said distal end area along the peripheral wall.

8. The extractor as claimed in claim 7, wherein said reaction means comprises upstanding barbs arranged to engage the helical wound rod in the distal end area of the wound rod section.

9. The extractor as claimed in claim 7, wherein said reaction means comprises upstanding filaments arranged to engaged the helical wound rod in the distal end area of the wound rod section.

10. The extractor as claimed in claim 7, wherein said reaction means comprises upstanding bristles arranged to engage the helical wound rod in the distal end area of the wound rod section.

11. The extractor as claimed in claim 1, including a second helically wound flexible rod section connected to the proximal end of the first said wound rod section, said second wound rod section connected to said drive means for transmitting rotary motion of the drive means to said first wound section, and a tubular conduit surrounding the second wound section and terminating at one end adjacent the proximal end of the first wound section and at another end outside the container, whereby said tubular conduit receives particulate material moved towards the proximal end of the first wound rod section when the first wound rod section is driven in rotation, and wherein said tubular conduit and said second wound rod section constitute a conveyor for moving particulate material out of the container when the second wound rod section is rotated within said tubular conduit.

* * * * *